United States Patent [19]

Fabian et al.

[11] Patent Number: 4,612,174

[45] Date of Patent: Sep. 16, 1986

[54] METHOD OF REMOVING NOXIOUS SUBSTANCES FROM GASES

[75] Inventors: Werner Fabian; Helmut Roehle; Peter Wolfram, all of Berlin, Fed. Rep. of Germany

[73] Assignee: Heinrich-Hertz-Institute für Nachrichtentechnik Berlin GmbH, Fed. Rep. of Germany

[21] Appl. No.: 670,478

[22] Filed: Nov. 13, 1984

[30] Foreign Application Priority Data

Nov. 24, 1983 [DE] Fed. Rep. of Germany ....... 3342816

[51] Int. Cl.$^4$ ............................................. B01D 53/00
[52] U.S. Cl. ..................................... 423/210; 423/240; 423/241; 423/220; 423/224; 423/278; 423/573 G; 55/72
[58] Field of Search ............... 423/210 R, 240, 210 M, 423/241, 220, 224, 278, 573 G; 55/72

[56] References Cited

U.S. PATENT DOCUMENTS

| 3,579,305 | 5/1971 | Neti | 423/240 |
| 3,607,004 | 9/1971 | Deschamps et al. | 423/224 |
| 4,066,739 | 1/1978 | Chen | 423/481 X |
| 4,094,962 | 6/1978 | Cocuzza | 423/224 |
| 4,355,010 | 10/1982 | Jodden et al. | 423/210 |
| 4,442,077 | 4/1984 | Foster et al. | 423/210 |

Primary Examiner—John Doll
Assistant Examiner—Robert L. Stoll
Attorney, Agent, or Firm—McGlew and Tuttle

[57] ABSTRACT

Waste gases and other noxious substances which are formed in connection with chemical processes and the manufacture of devices such as semiconductors and covalent hydrides and element organic compounds, etc. are treated so as to remove the noxious components. The inventive method removes noxious components from substances including waste gases one group or part of said noxious components containing covalent hydrides and element-organic compounds and another group or part of said noxious components containing halogens, halogens in aqueous solutions, and acid compounds such as hydrogen halides and pseudohalides; which removal comprising: oxidizing noxious components of said one group or part in a first stage and a spontaneous reaction by means of one of:
  a solution of bromic acid,
  a solution of iodic acid,
  a solution of bromate salt,
  a solution of iodate salt,
  an aqueous solution of bromine,
  an aqueous solution of iodine,
  an organic solution of bromine, and
  an organic solution of iodine,
so that they are absorbed by complete conversion into water-soluble acids and in which a bromine or iodine is formed as a free halogen, and in a second stage converting and dissolving in basic solutions the bromine and/or iodine which is formed in the first stage into a corresponding bromide or iodide or bromate or iodate as well as completely neutralizing the noxious components of said other group or part which have passed the first stage.

4 Claims, 2 Drawing Figures

METHOD OF REMOVING NOXIOUS SUBSTANCES FROM GASES

FIELD AND BACKGROUND OF THE INVENTION

This invention relates in general to the method of treating waste gases and in particular to a new and useful method for removing noxious components from waste gases.

The starting prior art is such as disclosed, for example, in German OS No. 23 23 508 for scrubbing sulfur dioxide, hydrochloric acid, fluorine, dust, and similar contaminents from flue gases. Even though not disclosed expressly, this prior art is obviously connected to a substantial reduction of noxious matter emissions in large firing installations, to obtain at the same time clean, usable, and thus marketable separation products, particularly gypsum.

The waste gas decontamination is important also to other industrial branches; in this connection, it may be that the utilization of the obtained separation products will appear far less important than the purpose proper, namely the decontamination.

In chemical processes, particularly also in the manufacture of semiconductors, poisonous, combustible and/or explosive gases are employed as starting products, or they form undesirable byproducts. This primarily includes gases of the group of covalent hydrides. Considerable problems are further encountered with the removal from waste gases of undecomposed trialkyl phosphanes insoluble in water.

In industrial gas separation plants provided to this end, the waste gases to be decontaminated are either burned, or directed through active carbon filters, or chemically converted. A combustion of inflammable and toxic gases or vapors is suitable particularly for unreactive organic compounds and for the removal of noxious substances containing certain metals, phosphorous or sulfur, and whose numerous compounds are toxic, corrosive, or otherwise noxious to the environment. This is done, for example, by means of a primary hydrogen flame with a considerable excess of oxygen in a coolable, closed combustion space specifically designed for this purpose. (see enclosed prospectus of the company Heraeus Quarzschmelze GmbH "Combustion Apparatus HI").

What is critical in that method is an open flame in laboratories where hydrogen is used as a carrier gas. The required large hydrogen amount causes considerable expenses. Toxic residues, such as arsenic oxide, even if diluted, pass into waste water.

Active carbon filters may be employed in instances where the noxious matter can be well handled, as to its kind and amount. It is uneconomical if such filters must be exchanged after short periods of time, and critical or even prohibitive, if changes must be made at unpredictable points of time.

Cleaning and reuse are problematic in view of the toxic adsorption products, so that relatively large volumina must be disposed of as extra waste.

A chemical conversion, such as described in the periodical Chemie-Technik, Vol. 11, 1982, No. 1, Pages 55,56 by means of copper sulfate and sulfuric acid, may be suitable for covalent hydrides. Problems arise, however, with element-organic compounds. For example, trimethylphosphine is converted to phosphonium salts, which, in non-acid environment, are reconverted into the initial product. The necessary admixture of fresh air upstream of the adsorption plant may result in uncontrollable reactions of compounds sensitive to air, such as trimethylindium in CVD plants.

SUMMARY OF THE INVENTION

The invention is directed to a method permitting the complete removal of the various noxious substances from waste gases at room temperatures and as near to the location of their use or formation as possible.

In accordance with the method of the invention, noxious components are removed from substances including waste gases, one group or part of said noxious components containing covalent hydrides and element-organic compounds and another group or part of said noxious components containing halogens, halogens in aqueous solutions, and acid compounds such as hydrogen halides and pseudohalides; which removal comprising: oxidizing noxious components of said one group or part in a first stage and a spontaneous reaction by means of one of:

a solution of bromic acid,
a solution of iodic acid,
a solution of bromate salt,
a solution of iodate salt;
an aqueous solution of bromine,
an aqueous solution of iodine,
an organic solution of bromine, and
an organic solution of iodine, so that they are absorbed by complete conversion into water-soluble acids and in which a bromine or iodine is formed as a free halogen, and in a second stage converting and dissolving in basic solutions the bromine and/or iodine which is formed in the first stage into a corresponding bromine or iodide or bromate or iodate as well as completely neutralizing the noxious components of said other group or part which have passed the first stage.

Covalent hydrides include boranes, such as diborane ($B_2H_4$), silane ($SiH_4$), germane ($GeH_4$), ammonia ($NH_3$), phosphine ($PH_3$) arsine ($AsH_3$), stibine ($SbH_3$), hydrogen sulfide ($H_2S$), hydrogen selenide ($SeH_2$), and hydrogen telluride ($TeH_2$). These noxious substances occur frequently in chemical vapor deposition (CVD) systems, but only in small amounts in waste gases. However, they are dangerous, or at least annoying, to an extent such that they cannot be released into the environment without a considerable reduction or even complete removal.

Trialkylphosphanes are obtained, for example, in the organometallic vapor phase epitaxy (OM-VPE). They also are toxic and strongly annoying by odor, and, in undecomposed state, insoluble in water.

Further present in process waste gases, particularly in the semiconductor manufacture, are hydrogen halides, and in individual instances, also pseudohalides. For example, the waste gas of a halide transportation VPE plant contains hydrochloric acid, among others.

It is of substantial importance to the invention, that in a wet chemical process of waste gas purification, excellent conditions are obtained for reaction between certain chemicals and the various supplied noxious substances, and that the noxious substances supplied in gaseous form are then available in solution. They may be removed as liquids and processed elsewhere.

Proved excellent oxidation agents and absorption liquids with which, considerable kinetically, covalent hydrides react quickly and quantitatively, are the above indicated bromine and iodine solutions. In addition, they are also suitable for converting triorgano phosphanes, under salt formation, into a water solution form, and then oxidizing them. In the first stage of the inventive method, one of these suitable solutions may thus be used simultaneously for the oxidation and absorption of a plurality of gaseous noxious substances.

In connection with the operation of this first stage of the inventive method, it should be mentioned that already several decades ago, the conditions under which covalent hydrides react with halide solutions halogen acids and other oxidation agents have been studied in the quantitative chemical analysis. Reactions between arsine and iodic acid, for example, are discussed in the periodical "Zeitschrift fur analytische Chemie 47, Berlin 1908, pages 105 to 125, and between phosphine and iodic acid and others in "Zeitschrift für anorganische und analytische Chemie 121, Leipzig 1922, pages 73–94. Still older are similar studies of hydrogen sulfide and iodic acid (see the manual "Gmelins" Handbuch der Anorganischen Chemie 8 ed. Verlag Chemie, Berlin 1933 entry iodine, page J 497). In the meantime, more modern methods and apparatus have been provided for quantitative analyses, however, nothing has been reported on such reaction conditions in connection with their use. Up to the present time, no publications are known relating to the reactive behavior of the other covalent hydrides. As to trimethylphosphane and triethylphosphane, their resistance to temperatures and toxicity have recently been reported (see "Journal of Crystal Growth" 55, 1981, page 129–134, Inst. Phys. Conf. Ser. No. 65; chapter 2, paper presented at Int. Symp. GaAs and Related Compounds, pages 93–100, or "Methoden der Organischen Chemie" Houben-Weyl, 4th Ed. Vol. XII/1 part 1, Georg Thieme publication Stuttgart 1963 pages 14–15). These references, however, do not teach how to remove such gaseous noxious substances from a waste gas.

Instead of the noxious substances supplied to the first stage where they have been completely converted into water-soluble acids, the gases to be supplied to the second stage contain bromine or iodine and such process gases which have not yet been removed in the first stage, particularly hydrogen halides. By means of a basic solution, the hydrogen halide is neutralized in a conventional way, but also bromine and iodine are converted to bromide and bromate or iodic and iodate, and dissolved.

The waste gases leaving the second stage have their noxious substance content reduced below the detection limit, thus to less than 1 ppb ($10^{-9}$).

The invention may be applied with particular advantage to cleaning of process gases containing element-V-hydrides. Taken into account are primarily phosphine and arsine for manufacturing III-V-semiconductor materials. But covalent hydrides are also employed for doping semiconductor material, as well as for manufacturing silicon and germanium material. Boranes are further frequently used in the synthesis chemistry. Hydrogen sulfide is obtained in large amounts, for example, in the combustion of fossil fuels. Pointing out the element-V-hydrides for the inventive method is therefore not intended as a limitation.

As element compounds in process waste gases, triorganophosphanes are of particular importance to the invention. That is, by means of the mentioned bromine, and particularly iodine solutions, water-soluble phosphonium salts are formed, so that the resistance to temperatures of trimethylphosphane and tryethylphosphane, for example, does no longer matter in the removal of these noxious substances from the waste gases. Harmless phosphate acid is formed by the oxidation of phosphonium salts. During the oxidation in the first stage, bromine or iodine is set free and passes with the already largely cleaned waste gas into the second stage. A hydrogen halide or pseudohalide, in a preferred application of the invention hydrogen chloride, may still be contained in this largely cleaned waste gas, which is then neutralized in the basic solution of the second stage.

This basic solution may be a hydroxide in solution, aqueous or non-aqueous, advantageously potassium hydroxide, soda lye, or lime milk.

In general, the concentration of noxious substances taken into account in the invention for the removal from waste gases is small. However, the invention starts from the assumption that these noxious substances are not going to be collected from a plurality of widely spaced-apart locations, but that they should be removed from waste gases as close as possible to the location of their use or formation. In this regard, another variant of the invention offers an advantageous compromise solution: a plurality of first stages may be provided, which, independently of each other, are associated with the respective processing plant, and operate on a common second stage. This also means that the individual first stages need not be operated all with the same bromine or iodine solution. In each of these first stages, the optimum agent can be used. All the waste gases passing therefrom to the second stage are already cleaned to a large extent and contain only relatively harmless gases and/or vapors which are then removed by means of the same basic solution in the second stage, independently of the agents alternately used in the first stages.

It has already been mentioned above that the concentration of noxious substances in the waste gas leaving the second stage is reduced below the detection limit. Nevertheless, it is advisable in any process in accordance with the invention, or as a safety measure, to direct this waste gas in addition through a carbon filter.

The various features of novelty which characterize the invention are pointed out with particularity in the claims annexed to an forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
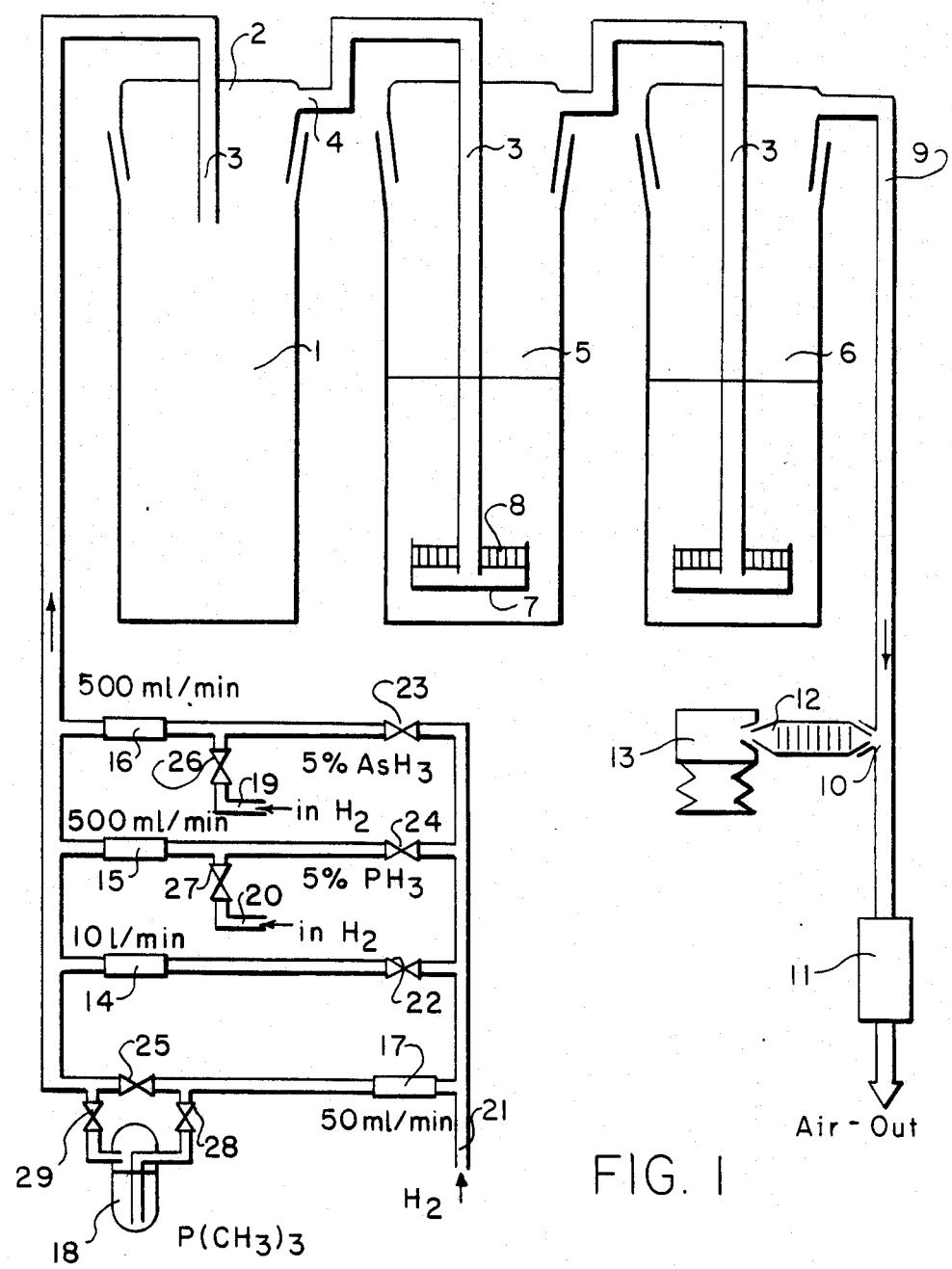
FIG. 1 is a schematic view of a test setup with laboratory gas-washing bottles.

In the test apparatus of claim 1, a first wash bottle 1 is intended only as a security preventing a return-flow of liquid by suction into the pipe system. This bottle 1 is provided with a stopper 2, a supply tube 3, and an outlet tube 4. In wash bottles 5 and 6, the supply tube 3 extends down to near the bottom where it carries a deflection cup 7 which is covered by frittered material or a perforated plate 8 to finely disperse the supplied gaseous substance. The design and equipment of wash bottles 5 and 6 is quite identical. Wash bottles 5,6 have a volume of 100 ml and they are connected in series. Discharge tube 9 of 3rd wash bottle 6 leads to a measuring point 10 and then through an active carbon filter 11 to the free ambience.

At the measuring point 10, measuring tubes 12 are mounted. (Dräger Tubes Co. Dräger Lubeck 1, No. CH 25001 for arsine detection, CH 21201 for phosphine detection). After each passage, a hand pump 13 is actuated in several stroke, to reach the measured value.

The following tests have been conducted:

Test Series 1

Wash bottles 5 and 6 were filled each with about 60 ml of ln $HIO_3$ solution. Hydrogen $H_2$ as carrier gas was supplied through a line 21, and phosphine as noxious gas was supplied through a line 20 in a concentration of 5% $PH_3$ in $H_2$. The rate of flow was adjusted for $H_2$ on a controller 14 to 5 l/min. for $PH_3$ on controller 15 to 5,10,20 and once again 5% of the maximum rate (100% = 500 ml/min), and valves 22 for $H_2$ and 27 for $PH_3$ were opened each for the time period of about 1 minute.

The results of tests series 1 are shown in table 1:

TABLE 1

| | | | | |
|---|---|---|---|---|
| $H_2$ [l/min] | 5 | 5 | 5 | 5 |
| $PH_3$ in $H_2$ [Ml/min] | 25 | 50 | 100 | 25 |
| $PH_3$ [ppm]* | ~250 | ~500 | ~1000 | ~250 |
| Number of strokes | 10 | 10 | 2 | 3 |
| $PH_3$ concentration [ppm] | 0.1 | — | ~2.5 | 2.0 |

*A correct computation of the concentration of course results in somewhat smaller values, for example in the first column 248.76, since $PH_3$ = 5% of 25 ml/min = 1.25 ml/min, and the total amount of $H_2 + PH_3$ = 5 l/min + 25 ml/min = 5025 ml/min. The reading on tube 12, however, is much less accurate, so that no such accurate computing of the concentration is necessary.

It follows from table 1 that the conducted tests have necessarily been disturbed. All the tubes 12 became colored. This coloration has been attributed to $I_2$ vapor formation in the test setup.

Therefore,

Test Series 2

Has been conducted, in which bottle 6 was filled with about 50 ml of a 2 n KOH solution, to recover the iodine evaporated in the first stage (wash bottle 5). The details of test series 2 are shown in table 2:

TABLE 2

| | | | | |
|---|---|---|---|---|
| $H_2$ [l/min] | 5 | 5 | 5 | 5 |
| $PH_3$ in $H_2$ [Ml/min] | 25 | 50 | 100 | 250 |
| $PH_3$ [ppm] | 250 | 500 | 1000 | 2500 |
| Number of strokes | 10 | 10 | 10 | 10 |
| $PH_3$ concentration [ppm] | ~0.1 | ~0.5 | ~0.1 | ~0.1 |

The result of test series 2 is extraordinarily satisfactory. By opening valves 24 and 14, the test apparatus was rinsed with $H_2$ and cleaned from phosphine $PH_3$.

Test Series 3

Tested was the effectiveness against arsine $AsH_3$. As in test 2, bottles 5 and 6 were filled each with about 50 ml of an ln $HI)_3$ solution (first stage) and with 50 ml of a 2 n KOH solution (second stage). Arsine, also in a concentration of 5% of $AsH_3$ in $H_2$, was supplied through line 19, and valves 22 for $H_2$ and 26 for $AsH_3$ were opened each for the duration of about one minute. Flow was controlled by controller 16. The results of tests series 3 are shown in table 3:

TABLE 3

| | | | | |
|---|---|---|---|---|
| $H_2$ [l/min] | 5 | 5 | 5 | 5 |
| $AsH_3$ in $H_2$ [ml/min] | 100 | 250 | 50 | 100 |
| $AsH_3$ [ppm] | 1000 | 2500 | 500 | 1000 |
| Number of strokes | 20 | 3 | 10 | 20 |
| $AsH_3$ concentration | 0.25 | 2 | 0.5 | 0.5 |

This test series 3 has also provided extraordinarily satisfactory but has also shown that the initially good result after an (expected) worse value, i.e. higher concentration of $AsH_3$ in the waste gas at an also higher content of this noxious substance in the supply gas stream, has not entirely been reached again. This hysteresis may be due to plate 8 in wash bottle 5, which has not been changed during the test series and in the third and fourth test still contained arsine residues from the second test. By openings valves 23 and 22, the test apparatus was rinsed with $H_2$ and cleaned from arsine $HsH_3$.

Test Series 4

To check test series 2 (phosphine), a sniffling line was held spaced about 2 cm from the discharge opening of tube 9. That is, while connecting the sniffling line to discharge tube 9 directly, the reading on the connected monitor (L'Air liquide Hydride Sensor) would be erroneous, due to an unsatisfactory rate of gas flow. The monitor has a detection limit of 0.5 ppb for arsine, and 2 ppb for phosphine. Adjusted were 5 l/min of $H_2$, and 100 ml/min of 5% $PH_3$ in $H_2$. This corresponds to a $PH_5$ concentration of 1000 ppm. No $PH_3$ has been detected at the monitor.

To test the monitor, this measurement was repeated, only with the sniffling line upstream of the first stage, thus upstream of the inlet of second wash bottle 5, i.e. at outlet tube 4. With again 5 l/min of $H_2$ and with 25 ml/min of 5% $PH_3$ in $H_2$, corresponding to 250 ppm of $PH_3$, a full alarm has been started by the monitor.

Test 5

As in test series 2,3 and 4, wash bottles 5 and 6 were filled with a 1 n $HIO_3$ solution, and a 2 n KOH solution, respectively. To test the effectiveness for trimethylphosphane (TMP), 5 l/min were adjusted for carrier gas $H_2$ from line 21, and 10 ml/min through controller 17, valve 28, valve 25, container 18 with $P(CH_3)_3$, and valve 29. The smelling test showed: nothing detectable at discharge tube 9; distinct phosphine odor at outlet tube 4 (thus before the second stage removal of the noxious substance).

Figure 2:
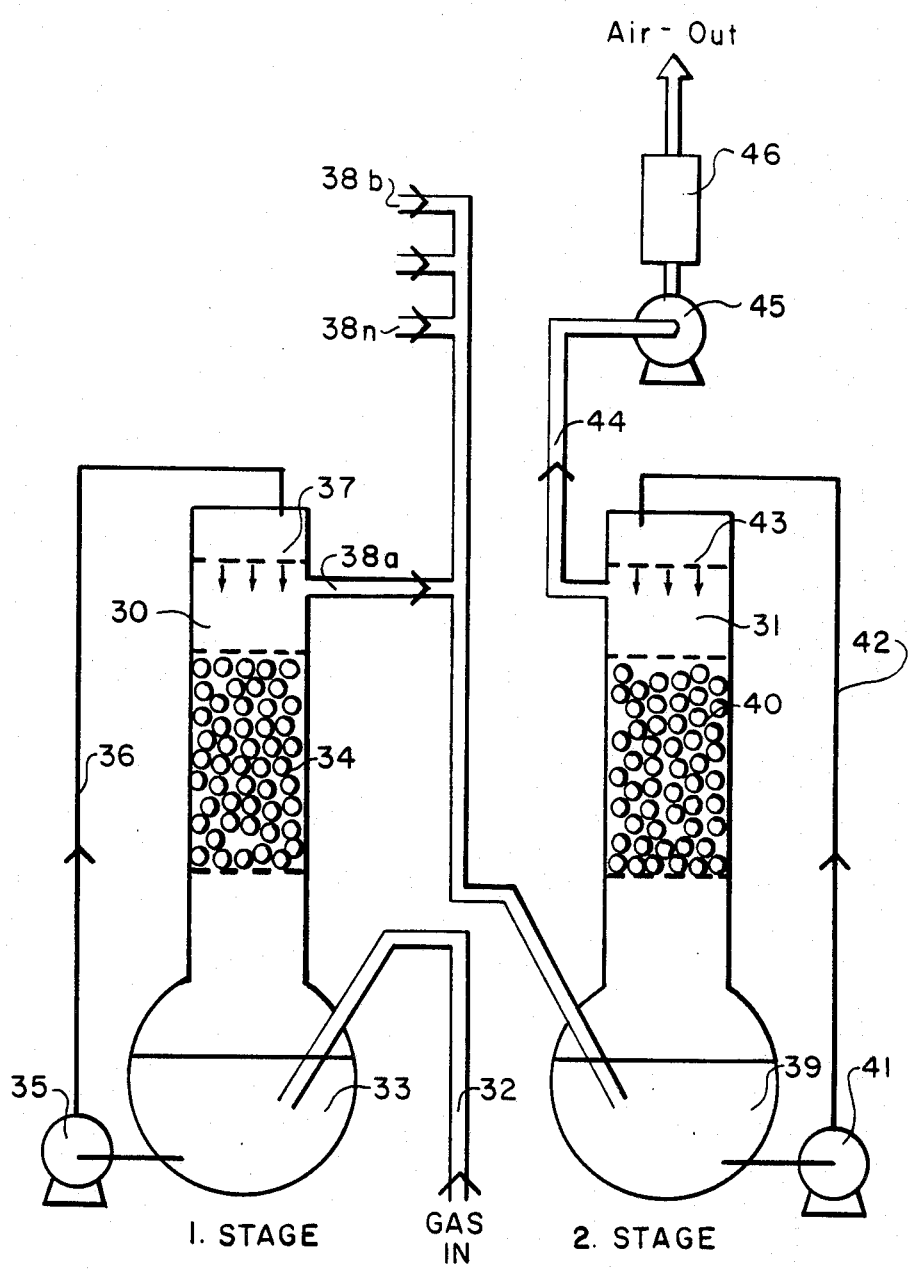
FIG. 2 is a schematic view of a two-stage decontamination plant of apparatus for the method of the invention.

Based on the results of these tests, a two stage gas decontamination plant was set up in accordance with the basic sketch of FIG. 2.

The waste gas is supplied through a line 32 into a vessel 33 of the first stage which is filled with an acidification iodate solution, bubbles through the acid solution and flows up in a column 30 of filling bodies. The acid solution is continuously drawn off vessel 33 by a pump 35 and is forced through a line 36 into the head 37 of the column, where it is finely distributed. The solution then trickles through the layer 34 of filling bodies countercurrently to the ascending gas stream. The pumping cycle of the solution volume is about 1 minute.

In the first stage of this plant, phosphine, arsine, etc. as well as trimethylphosphane or similar triorgano phosphanes are removed from the waste gas, i.e. oxidized and absorbed or converted into a water-soluble form while forming a salt, and oxidized. The formed iodine or halogen, depending on the composition of the acid solution in vessel 33, thus also bromine, for example, passes through a line 38a into the second stage of the gas decontamination plant.

Further first stages, designed and operated similarly, may be connected to the same second stage through lines 38b, etc. to 38n.

The design of the second stage is widely similar to that of the first stage. A vessel 39 is filled with a basic solution, such as a KOH solution, which is circulated by a pump 41 through a line 42 to head 43 of a column 31 where it is distributed to trickle down through a layer of filling bodies 40 countercurrently to the ascending gas. Iodine is then converted to iodide or iodate, or bromine to bromide or bromate, and dissolved, and hydrogen halides having passed through the first stage are neutralized.

By means of a pump 45, a waste gas cleaned below the detection limit is taken off through a discharge line 44 and, for safety reasons, directed through a carbon filter to the free ambiance. A series connection of 2 carbon filters with a sniffle line therebetween for determining the content in noxious substances has not proved necessary during the hitherto conducted operations.

Each stage may be designed with a plurality of columns on the vessel. This facilitates the handling and, particularly, permits maintenance and repair without interrupting the operation.

For the first stage, a solution of 1 kg of $NaIO_3$ in about 25 l of $H_2O$ was provided. Then, 100 g of concentrated $H_2SO_4$ were diluted in about 1 l of $H_2O$, and 4 g of KI were added as a catalyst to accelerate the reaction.

As the basic solution for the second stage, a solution of 448 g of NaOH in about 25 l of $H_2O$ has also proved particularly suitable.

Measurements made in accordance with the test series above as well as with $AsH_3$ and $PH_3$ alone or admixed in waste gas and with other noxious substances, among them HCl, have shown that a gas decontamination plant according to FIG. 2, due to the filling bodies, not only lowers the noxious gas concentration below the detection limit of Dräger tubes, but also below that of the substantially more sensitive monitor, already upstream of carbon filter 46 which is provided only as an additional safety.

The concentration of the iodate ions in solutions of the first stage can easily be determined anytime, for example by a reduction with sulfurous acid, extraction of the obtained iodine and then titration with a thiosulfate solution.

With a 1 n $NaIO_3$ solution and the usual low concentrations of phosphine ($PH_3$) and arsine ($AsH_3$), as found in waste gases of CVD plants, the poisonous residues of the iodate solution must be removed every one to two years. Upon using up the iodate, the solution may be concentrated by evaporation and, for example, the arsenic residue precipitated as $As_2S_3$. These small amounts of solid residue can easily be disposed of as extra waste.

Accordingly, the present invention involves a method of of removing noxious substances from waste gases at room temperature and near the location where they are formed, particularly for substances which are used in the semiconductor field. The noxious substances which can be treated by the invention include covalent hydrides, element-organic compounds, as well as noxious components containing halogens, halogens in aqueous solutions, and acid compounds such as hydrogen halides and pseudohalides. The element-organic compounds include triorganophosphanes, trialkylphosphanes, trimethylphosphine, trimethylphosphane, and triethylphosphane. The removal of these noxious compounds includes oxidizing the covalent hydrides or element-organic compounds in a spontaneous reaction by means of a solution of bromic acid, a solution of iodic acid, a solution of bromate salt, a solution of iodate salt, an aqueous solution of bromine, an aqueous solution of iodine, an organic solution of bromine, or an organic solution of iodine. In this step the named noxious components are absorbed by complete conversion into water soluble acids in which a bromine or iodine is formed as a free halogen. The method includes a second step for converting and dissolving, in basic solutions, the bromine and/or iodine which is formed in the first stage to a corresponding bromide or iodide or bromate or iodate as well as completely nuetralizing the noxious components containing halogens, halogens in aqueous solution, and acid compounds such as hydrogen halides and pseudohalides, which have passed through the first stage.

While specific embodiments of the invention have been shown and described in detail to illustrate the application of the principles of the invention, it will be understood that the invention may be embodied otherwise without departing from such principles.

What is claimed is:

1. A method of removing noxious components from substances including waste gases, where the noxious components contain at least one of phosphine, arsine and trimethylphosphane; which removal comprising: oxidizing the phosphine, arsine and trimethyl phosphane at room temperature in a first stage and a spontaneous reaction by means of one of:

a solution of bromic acid,
a solution of iodic acid,
a solution of bromate salt,
a solution of iodate salt,
an aqueous solution of bromine,
an aqueous solution of iodine,
an organic solution of bromine, and
an organic solution of iodine, so that they are absorbed by complete conversion into water-soluble acids and in which a bromine or iodine is formed as a free halogen, and in a second stage, converting and dissolving in basic solution, the bromine or iodine which is formed in a first stage into a corresponding bromide or iodide or bromate or iodate.

2. A method according to claim 1, wherein hydroxide in solution is used in the second stage as the basic solution.

3. A method according to claim 1, wherein a plurality of first stages which are associated with independent processing plants operate onto a common second stage.

4. A method according to claim 1, wherein the waste gases leaving the second stages are directed through carbon filters.

* * * * *